March 14, 1944.    R. A. FORESMAN    2,344,347
MATERIAL HANDLING APPARATUS
Filed April 15, 1942    3 Sheets-Sheet 2
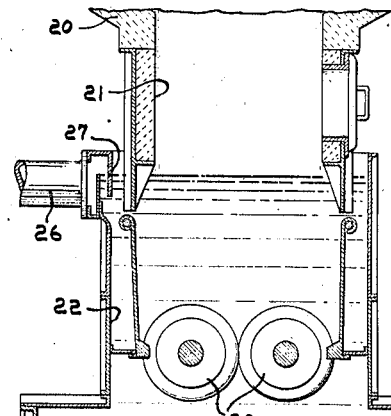
FIG. 2.
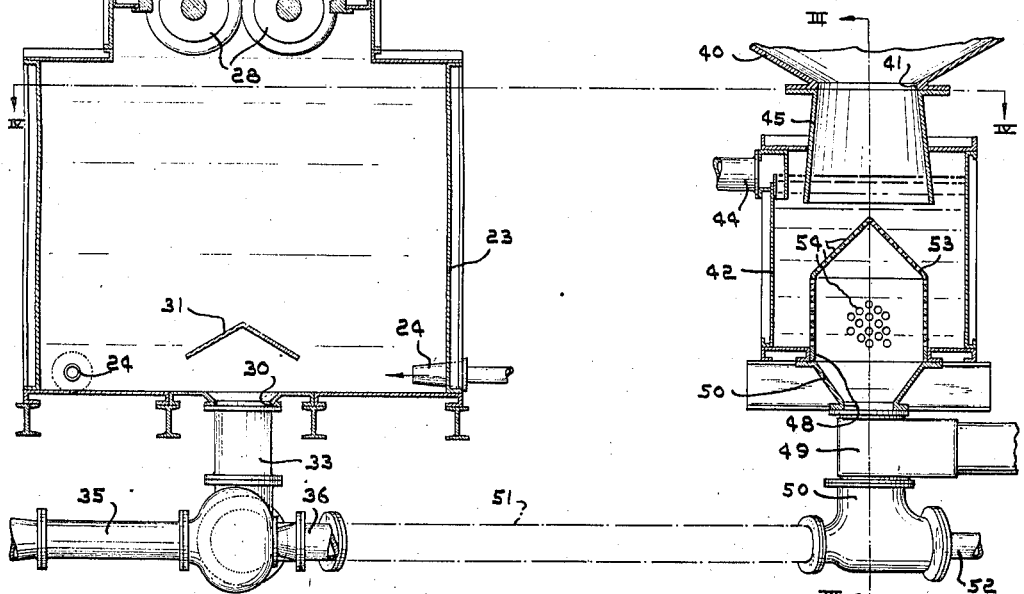
FIG. 3.
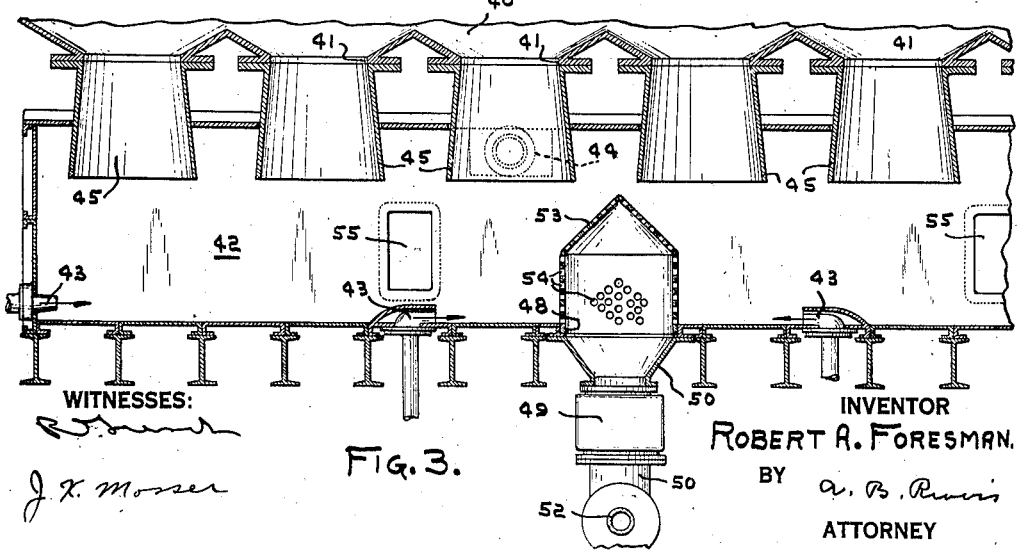
WITNESSES:
INVENTOR
ROBERT A. FORESMAN.
BY
ATTORNEY March 14, 1944.                R. A. FORESMAN                2,344,347
                        MATERIAL HANDLING APPARATUS
                          Filed April 15, 1942          3 Sheets-Sheet 3

WITNESSES:

INVENTOR
ROBERT A. FORESMAN
BY
ATTORNEY

Patented Mar. 14, 1944

2,344,347

UNITED STATES PATENT OFFICE 2,344,347

MATERIAL HANDLING APPARATUS

Robert A. Foresman, Prospect Park, Pa., assignor to Westinghouse Electric & Manufacturing Company, East Pittsburgh, Pa., a corporation of Pennsylvania Application April 15, 1942, Serial No. 439,021

2 Claims. (Cl. 110—171)

The present invention relates to material-handling apparatus, more particularly to a hydraulic conveyor system for the solid products of combustion from furnaces, and it has for an object the provision of improved apparatus of this character.

Heretofore, it has been believed that fly ash could not be removed and transported successfully by hydraulic means, and as a result, in actual practice, fly ash has been collected dry and transported in that state to a hopper outside of the plant. Generally, pneumatic means have been relied upon in such removal of fly ash from the separator to the externally-located hopper. The use of pneumatic conveying means in such installations produces an undesired result in that there is generally considerable leakage of air from the conveying system to the separator, thereby reducing the draft.

The present invention contemplates the elimination of these and other defects by the provision of novel hydraulic material-transporting mechanism. Therefore, another object of the invention is the provision of a closed hydraulic material-conveying system.

Yet another object of the invention is to provide a single closed hydraulic system for transporting both fly ash and slag from a pulverized fuel-fired furnace and boiler installation to a point of final discharge or storage.

A further object of the invention is to provide a closed and sealed hydraulic system for conveying fly ash from a point in the flow path of gases through combustion apparatus where the pressure is below atmospheric to a place of discharge which is at atmospheric pressure.

These and other objects are effected by the invention as will be apparent from the following description and claims taken in connection with the accompanying drawings, forming a part of this application, in which:

Fig. 2 is a vertical sectional view, at an enlarged scale, of a portion of the apparatus shown in Fig. 1;

Fig. 3 is a longitudinal sectional view taken along the line III—III of Fig. 2, looking in the direction of the arrows.

Figure 1:
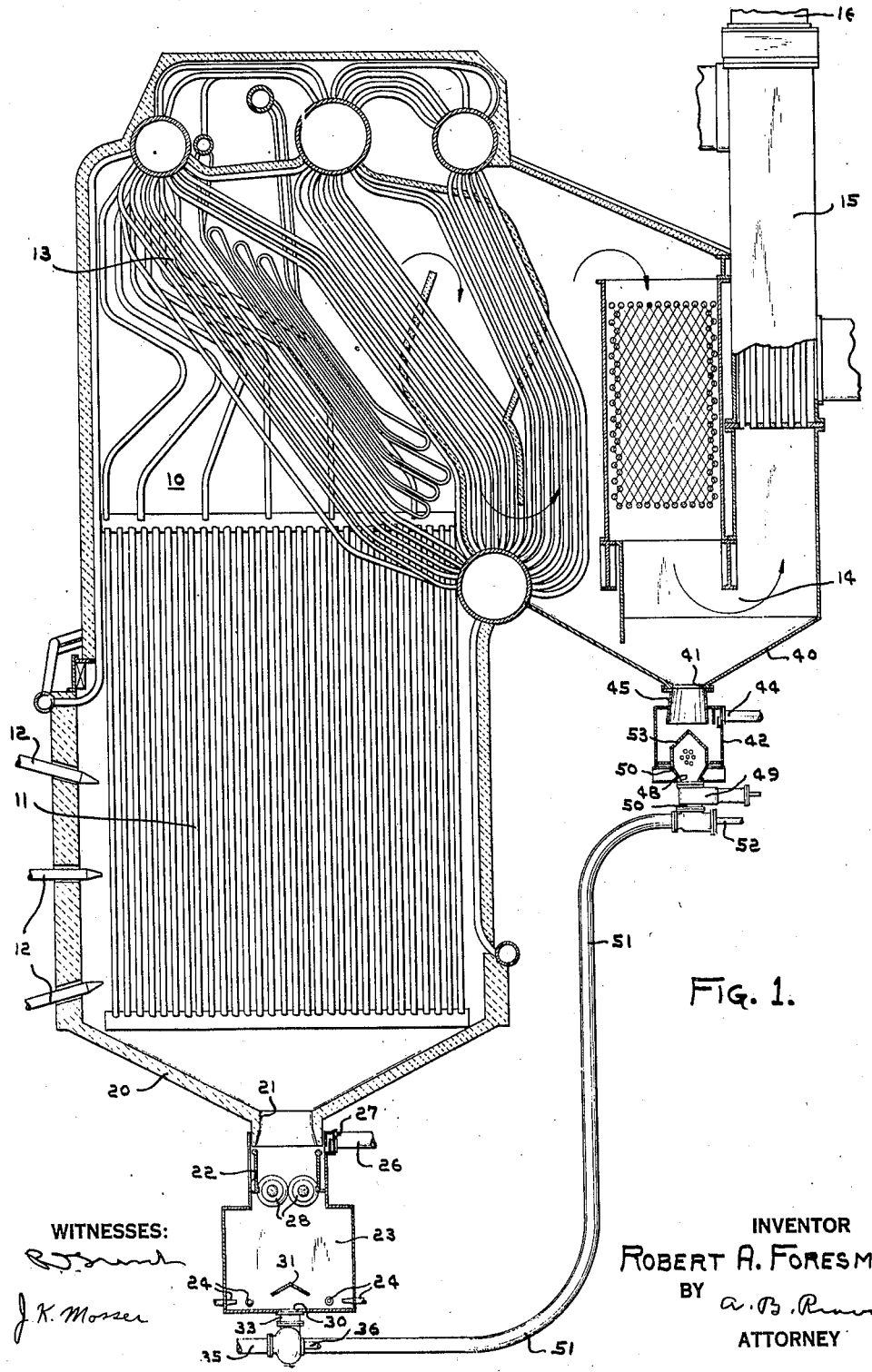
Fig. 1 is a vertical sectional view of a pulverized-fuel-fired furnace-boiler installation embodying the features of the invention.

Referring now to the drawings more in detail, there is shown, at 10, a pulverized-fuel-fired furnace-boiler installation comprising a furnace 11 having suitable means, such as the nozzles 12, providing for burning of pulverized fuel therein, the hot products of combustion from the furnace passing upwardly through a boiler 13. After leaving the boiler, the hot gases pass through a fly ash separator 14 and an air preheater 15 before exhausting through the stack 16.

The inclined bottom wall 20 of the furnace 11 is provided at its lowest point with a slag outlet opening 21 aligned with the inlet 22 of a slag pit 23 disposed therebeneath. Suitable means, such as the nozzles 24, are provided for supplying water to the pit 23, the maximum level of water within the pit being determined by the overflow connection 26, the latter being so positioned as to provide a water seal 27 between the inlet 22 of the pit and the outlet 21 of the furnace discharge opening. If desired, clinker or slag grinding rolls 28 may be provided in the pit, these preferably being located near the top thereof, but below the normal level of water therein.

Figure 4:
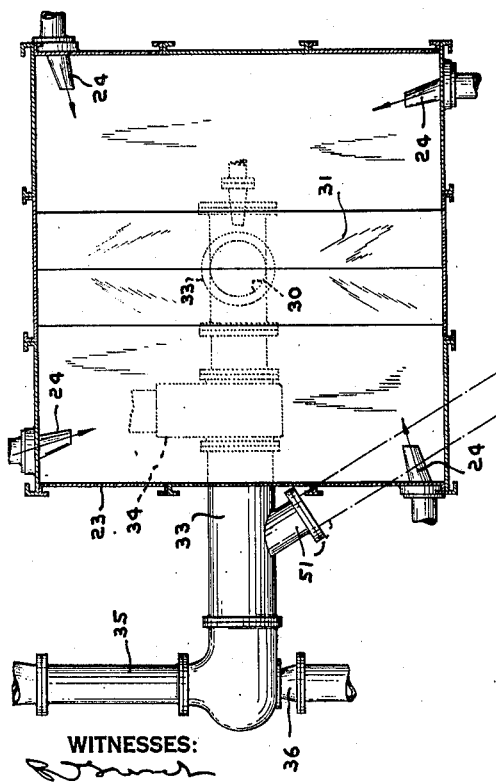
Fig. 4 is a horizontal sectional view taken along the line IV—IV of Fig. 2, looking in the direction of the arrows.
Figure 4:
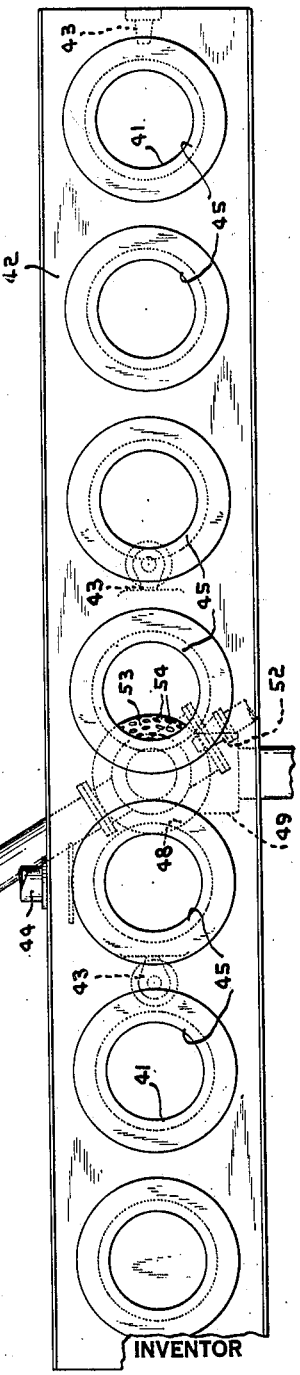

The pit 23 is provided, in its bottom wall, with a discharge opening 30, and to prevent unnecessary clogging of this opening by slag collecting within the pit there is provided a deflecting baffle 31 extending transversely of the pit in overlying relation to the discharge opening 30. A conduit 33, controlled by a hydraulic valve 34 (Fig. 4), provides for passage of mixed water and slag from the pit 23 to the main discharge conduit 35. Preferably, an ejector 36 is associated with the conduit 35 at a point adjacent to the inlet thereto of the conduit 33, to assist the transportation or flow of water and slag along the conduit 35 to the point of final discharge.

That portion of the boiler and stack structure which houses the fly ash separator 14 is constructed to provide beneath the separator a hopper 40, having a plurality of discharge openings 41 in the bottom thereof and adapted to provide for gravitational discharge of dry fly ash to a tank 42, positioned therebeneath.

Suitable means, such as the nozzles 43, are provided for supplying water to the tank 42, a maximum level of water within the tank being determined by the overflow connection 44 adjacent the top thereof.

A plurality of tubular members 45 have their upper ends secured to the bottom of the hopper 40 in registry with the discharge openings 41. The tubular members 45 are of such length that their lower terminal portions extend beneath the surface of the body of water normally maintained within the tank 42, whereby an airtight connection is provided between the hopper 40 and the body of water. It will be noted that this arrangement, while providing an airtight connection, permits of the flexibility desirable and necessary for practical construction and assembly of the hopper and tank with respect to each other. Preferably, the tubular members 45 diverge downwardly from a minimum diameter at their inlet ends with the result that any material entering them is unconfined during its passage downwardly therethrough.

The tank 42 is provided at the bottom with a discharge opening 48, flow therethrough of the mixture of fly ash and water being controlled by the hydraulic valve 49 mounted in the conduit 50, which, together with the conduit 51, provides for discharge of material from the tank 42 to the main discharge conduit 35. In order to assist flow of material through the conduit 51 to the main discharge conduit, there may be provided an ejector 52 at the juncture of the conduits 50 and 51.

To prevent clogging of the outlet opening 48 by pieces of slag too large to pass through the same or to be handled by the ejector, there is provided a grid or screen 53 having numerous perforations 54 therethrough, the latter being of sufficient size to permit normal passage therethrough of the mixture of water and fly ash but to prevent the passage of larger pieces of slag. It will be noted from Figs. 3 and 4 that the nozzles 43 are so positioned as to direct jets of water toward the discharge opening 48 and its protecting grid or screen 53, with the result that large pieces of slag will be projected against the grid with considerable force, thereby eventually reducing their size sufficiently to permit their discharge from the tank. Preferably, one or more clean-out openings 55 are provided in the side walls of the tank to permit the removal of pieces of slag which resist reduction in size.

In operation, both the pit 23 and the tank 42 are normally maintained filled with water to the level provided for by the overflow conduits 26 and 44, respectively. When a sufficient amount of refuse has accumulated in either the pit or the tank, water is supplied through the jets and the hydraulic valves opened to permit discharge of the mixture of refuse and water, the jets provided by the nozzles serving to agitate the mixture and render the same fluent as well as to direct the mixture toward the discharge opening. Obviously, at the same time water would be supplied through the adjacent ejector to aid the flow of material along the conduit. As soon as the pit or tank is emptied, the hydraulic valve is closed to provide for refilling of the tank to its normal level, the refuse being collected therein again for repeated discharge as occasion requires.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a refuse disposal system for a pulverized-fuel-fired furnace and boiler installation; a separator for fly ash disposed in the flow path of gases from the boiler, a hopper beneath the separator adapted to receive fly ash removed from the gases by the separator, a tank below the hopper, means for supplying water to said tank, means for maintaining a predetermined level of water therein, means providing an airtight passageway for gravitational discharge of fly ash from the hopper to the body of water within the tank, a main refuse discharge conduit, first valve-controlled means providing for periodic discharge of mixed water and fly ash from the tank to the main discharge conduit, a slag pit having an inlet opening in its top in airtight communication with a slag discharge opening in the bottom of the furnace, means for supplying water to the slag pit, means for normally maintaining a predetermined level of water in the slag pit, and second valve controlled means providing for periodic discharge of mixed water and slag from the pit to the main discharge conduit.

2. Structure as specified in claim 1, including an ejector associated with each of said valve-controlled means to aid in discharge of material to the main discharge conduit.

ROBERT A. FORESMAN.